(12) United States Patent  (10) Patent No.: US 8,537,949 B1
Cirit et al.  (45) Date of Patent: Sep. 17, 2013

(54) SYSTEMS, CIRCUITS AND METHODS FOR FILTERING SIGNALS TO COMPENSATE FOR CHANNEL EFFECTS

(75) Inventors: Halil Cirit, Burlingame, CA (US); Stefanos Sidiropoulos, Palo Alto, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 372 days.

(21) Appl. No.: 12/828,153

(22) Filed: Jun. 30, 2010

(51) Int. Cl.
*H04L 7/00* (2006.01)

(52) U.S. Cl.
USPC ........... 375/371; 375/226; 375/295; 375/316; 375/348; 375/350

(58) Field of Classification Search
USPC ................ 375/146, 147, 226, 229, 285, 295, 375/316, 348, 350, 371
See application file for complete search history.

(56) References Cited

U.S. PATENT DOCUMENTS

| | | | |
|---|---|---|---|
| 3,601,543 | A | 8/1971 | Maniere et al. |
| 4,110,558 | A | 8/1978 | Kageyama et al. |
| 4,314,212 | A | 2/1982 | Gradl |
| 4,507,629 | A | 3/1985 | Frank |
| 4,586,010 | A | 4/1986 | Linnenbrink |
| 4,621,242 | A | 11/1986 | Theall et al. |
| 5,124,670 | A | 6/1992 | Lawton |
| 5,392,348 | A * | 2/1995 | Park et al. .................... 379/386 |
| 5,471,162 | A | 11/1995 | McEwan |
| 5,519,342 | A | 5/1996 | McEwan |
| 5,559,474 | A | 9/1996 | Matsumoto et al. |
| 5,712,583 | A | 1/1998 | Frankeny |
| 5,712,882 | A | 1/1998 | Miller |
| 5,864,250 | A | 1/1999 | Deng |
| 6,125,157 | A | 9/2000 | Donnelly et al. |
| 6,167,467 | A | 12/2000 | Itoh |
| 6,226,332 | B1 | 5/2001 | Agazzi et al. |
| 6,242,990 | B1 | 6/2001 | Sokolov |
| 6,285,726 | B1 | 9/2001 | Gaudet |
| 6,317,008 | B1 | 11/2001 | Gabara |
| 6,466,098 | B2 | 10/2002 | Pickering |

(Continued)

OTHER PUBLICATIONS

U.S. Appl. No. 10/176,495, filed Jun. 21, 2002, Sidiropoulos et al.

(Continued)

*Primary Examiner* — Hirdepal Singh
(74) *Attorney, Agent, or Firm* — Sterne, Kessler, Goldstein & Fox P.L.L.C.

(57) ABSTRACT

Transmitter waveform dispersion penalty ("TWDP") is decreased in a transmitter. A binary data signal is received for transmission over a channel that exhibits TWDP. The data signal is shifted less than a full clock cycle to generate at least one post cursor signal. The post cursor signal is subtracted from the data signal to generate a transmitter output data signal for transmission over the channel. In addition to decreasing TWDP, data dependent jitter is also reduced for data transmission across a channel that exhibits a multi-pole transmission characteristic. A main data signal and at least one cursor signal, which is shifted at least a portion of a clock period from the main data signal, is generated. The cursor signal is filtered to filter out effects based on the second pole of the multi-pole transmission characteristic. The main data signal is subtracted from the filtered cursor signal to generate the transmitter output data signal. Circuits and methods for transmitting serial data streams over a channel compliant with KR and SPI specifications are also disclosed.

20 Claims, 15 Drawing Sheets

(56) References Cited

U.S. PATENT DOCUMENTS

| | | |
|---|---|---|
| 6,535,043 B2 | 3/2003 | Chen |
| 6,570,946 B1 | 5/2003 | Homol et al. |
| 6,631,144 B1 | 10/2003 | Johansen |
| 6,650,157 B2 | 11/2003 | Amick et al. |
| 6,674,824 B1 | 1/2004 | Chiueh et al. |
| 6,693,496 B1 | 2/2004 | Lebouleux |
| 6,828,864 B2 | 12/2004 | Maxim et al. |
| 6,901,126 B1 | 5/2005 | Gu |
| 6,927,611 B2 | 8/2005 | Rhee et al. |
| 6,961,546 B1 | 11/2005 | Rofougaran |
| 6,967,513 B1 | 11/2005 | Balboni |
| 6,999,543 B1 | 2/2006 | Trinh et al. |
| 7,005,885 B1 | 2/2006 | Feldman |
| 7,054,404 B2 | 5/2006 | Saeki |
| 7,065,666 B2 | 6/2006 | Janzen |
| 7,078,946 B2 | 7/2006 | van der Valk et al. |
| 7,088,534 B2 | 8/2006 | Sutardja |
| 7,089,444 B1 | 8/2006 | Asaduzzaman et al. |
| 7,161,443 B2 | 1/2007 | Chen |
| 7,162,002 B2 | 1/2007 | Chen et al. |
| 7,177,352 B1* | 2/2007 | Plasterer et al. ............. 375/232 |
| 7,233,170 B2 | 6/2007 | Becker et al. |
| 7,317,360 B2 | 1/2008 | Keaveney et al. |
| 7,323,916 B1 | 1/2008 | Sidiropoulos et al. |
| 7,432,750 B1 | 10/2008 | Sidiropoulos et al. |
| 7,436,229 B2 | 10/2008 | Sidiropoulos et al. |
| 7,443,215 B1 | 10/2008 | Sidiropoulos |
| 7,532,697 B1 | 5/2009 | Sidiropoulos et al. |
| 7,679,345 B1 | 3/2010 | Verma et al. |
| 7,756,197 B1* | 7/2010 | Ferguson et al. ............ 375/224 |
| 7,835,236 B2* | 11/2010 | Ishimoto .................... 369/44.35 |
| 8,203,362 B2* | 6/2012 | Wang et al. .................... 326/93 |
| 8,259,841 B2* | 9/2012 | Dally ............................ 375/295 |
| 8,325,793 B2* | 12/2012 | Zhong .......................... 375/233 |
| 2001/0043649 A1 | 11/2001 | Farjad-Rad |
| 2003/0081709 A1 | 5/2003 | Ngo |
| 2003/0086501 A1 | 5/2003 | Dreps et al. |
| 2003/0091139 A1 | 5/2003 | Cao |
| 2003/0161430 A1 | 8/2003 | Sou |
| 2003/0182481 A1 | 9/2003 | Schoenborn |
| 2004/0202266 A1 | 10/2004 | Gregorius et al. |
| 2005/0111843 A1 | 5/2005 | Takeuchi et al. |
| 2006/0023602 A1 | 2/2006 | Rauschmayers |
| 2007/0064923 A1* | 3/2007 | Schmukler et al. ........ 379/406.1 |
| 2008/0049850 A1 | 2/2008 | Sidiropoulos et al. |
| 2008/0260071 A1 | 10/2008 | Sidiropoulos et al. |
| 2008/0298530 A1* | 12/2008 | Buckwalter et al. .......... 375/371 |
| 2008/0317109 A1* | 12/2008 | Healey et al. ................. 375/226 |
| 2009/0074407 A1* | 3/2009 | Hornbuckle et al. ........... 398/43 |
| 2010/0158538 A1* | 6/2010 | Mazzini et al. ............... 398/182 |
| 2010/0164445 A1 | 7/2010 | Verma et al. |
| 2010/0177816 A1* | 7/2010 | Malipatil et al. .............. 375/233 |
| 2011/0099213 A1* | 4/2011 | Snelgrove ......................... 708/3 |
| 2012/0013398 A1* | 1/2012 | Dabiri et al. .................. 327/553 |
| 2012/0170699 A1* | 7/2012 | Fischette et al. .............. 375/376 |

OTHER PUBLICATIONS

U.S. Appl. No. 11/781,712, filed Jul. 23, 2007, Sidiropoulos, et al.
U.S. Appl. No. 12/728,101, filed Mar. 19, 2010, Loinaz, Marc J.
U.S. Appl. No. 12/728,113, filed Mar. 19, 2010, Loinaz et al.
U.S. Appl. No. 12/728,129, filed Mar. 19, 2010, Liu et al.
U.S. Appl. No. 12/185,750, filed Aug. 4, 2008, Stefanos Sidiropoulos.
U.S. Appl. No. 12/828,125, filed Jun. 30, 2010, Cirit, Halil.
Sidiropoulos et al., Adaptive Bandwidth DLLs and PLLs using Regulated Supply CMOS Buffers, 2000 Symposium on VLSI Circuits Digest of Technical Papers.
Mansuri et al., A Low-Power Low-Jitter Adaptive-Bandwidth PLL and Clock Buffer, ISSCC 2003/Session 24/Clock Generation/Paper 24.5, ISSCC 2003/Feb. 12, 2003/Salon 8/ 3:45PM, 2003 IEEE International Solid-State Circuits Conference.
Mansuri et al. Jitter Optimization Based on Phase-Locked Loop Design Parameters, IEEE Journal of Solid-State Circuits, vol. 37, No. 11, Nov. 2002.
Maxim et al., A Low-Jitter 125-1250-MHz Process-Independent and Ripple-Poleless 0.18-μm CMOS PLL Based on a Sample-Reset Loop Filter, IEEE Journal of Solid-State Circuits, vol. 36, No. 11, Nov. 2001.
Maneatis, Self-Biased High-Bandwidth Low-Jitter 1-to-4096 Multiplier Clock Generator PLL, IEEE Journal of Solid-State Circuits, vol. 38, No. 11, Nov. 2003.
Sidiropoulos, A Semidigital Dual Delay-Locked Loop, IEEE Journal of Solid-State Circuits, vol. 32, No. 11, Nov. 1997.
U.S. Appl. No. 11/930,978, filed Oct. 31, 2007, Sidiropoulos et al.

* cited by examiner

SYSTEMS, CIRCUITS AND METHODS FOR FILTERING SIGNALS TO COMPENSATE FOR CHANNEL EFFECTS

BACKGROUND OF THE INVENTION

1. Field of the Invention

The present invention is related to the field of data communications, and more specifically towards systems, circuits and methods for improving data transmission by conditioning signals at a transmitter to compensate for channel effects.

2. Art Background

Electronic circuits utilize serial data transmission to transmit data among one or more circuits. In general, serial data transmission involves transmitting bits in a single bit stream at a predetermined data rate. The data rate is expressed as the number of bits transmitted per second ("bps"). Typically, to transfer data between circuits, the sending circuit employs a transmitter that modulates and sends data using a local clock. The local clock provides the timing for the bit rate. The receiving circuit employs a receiver to recover the data, and in some cases, the clock. The receiver circuit recovers the serial bit stream of data by sampling the bit stream at the specified data rate.

Some communication standards, which use optical channels to transfer data, demand high-speed data rates. For example, current standards transmit data across optical channels at 10 Giga bits per second (Gb/s). For example, two current standards for high-speed data transfer include the SFI specifications, associated with SFP+ optical modules, and the 10GBASE-KR specification from the IEEE for signaling over backplane channels in computer servers and networking equipment. For example, some standards, such as the SFI specification, require a transmitter to operate with a low transmitter waveform dispersion penalty ("TWDP") and low data dependent jitter ("DDJ") specifications at the same time. Prior techniques have been developed in an attempt to maximize the efficiency of serial data transfer at high rates. However, in some prior art design techniques, improving the TWDP cases a degradation of DDJ.

Accordingly, it is highly desirable to develop receiver and transmitter circuits that satisfy both standards such that improvements in TWDP does not cause degradation in DDJ.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

The systems, techniques and circuits disclosed herein improve data transmission, such as transmission of a serial bit stream, between a transmitter and a receiver over a channel. Specifically, the data transmission circuits and techniques optimize data transmission over channels that provide a first pole response and/or a multi-pole response to the serial data as it is propagated from a transmitter to a receiver over the channel.

A brief description of the origin and nature of the multi-pole characteristics of a channel follow. The response of a physical lossy transmission line (e.g., channel) to a serial data stream acts similar to a multi-pole system, because, in addition to the direct current ("DC") losses of the transmission line, the transmission line exhibits frequency-dependent losses. In general, the frequency-dependent losses are due to "skin effect" and dielectric absorption. In general, the skin effect of the transmission line causes the series resistance of the line to vary with frequency, and the dielectric absorption causes the conductance of the line to vary with frequency. Both effects result in increased attenuation at higher frequencies. The skin effect and dielectric absorption effect both slow and round off the initial part of the output edge of the serial data stream. However, the tail of the channel response conforms well to simple resistive-capacitive ("RC") behavior.

Even transmission lines with significant inductance act as RC lines below a cutoff frequency, wherein, $$f_0 = \frac{R}{2\pi L}$$

L defines the trace inductance per unit length, and R defines the trace resistance per unit length.

Below the cut-off frequency, the resistance is larger than the impedance of the inductor, and the transmission line behaves as a dispersive RC line. The dispersive behavior of the transmission line (e.g., channel) at low frequencies causes inter-symbol interference ("ISI") and increases data dependent jitter in the data signal.

Figure 1:
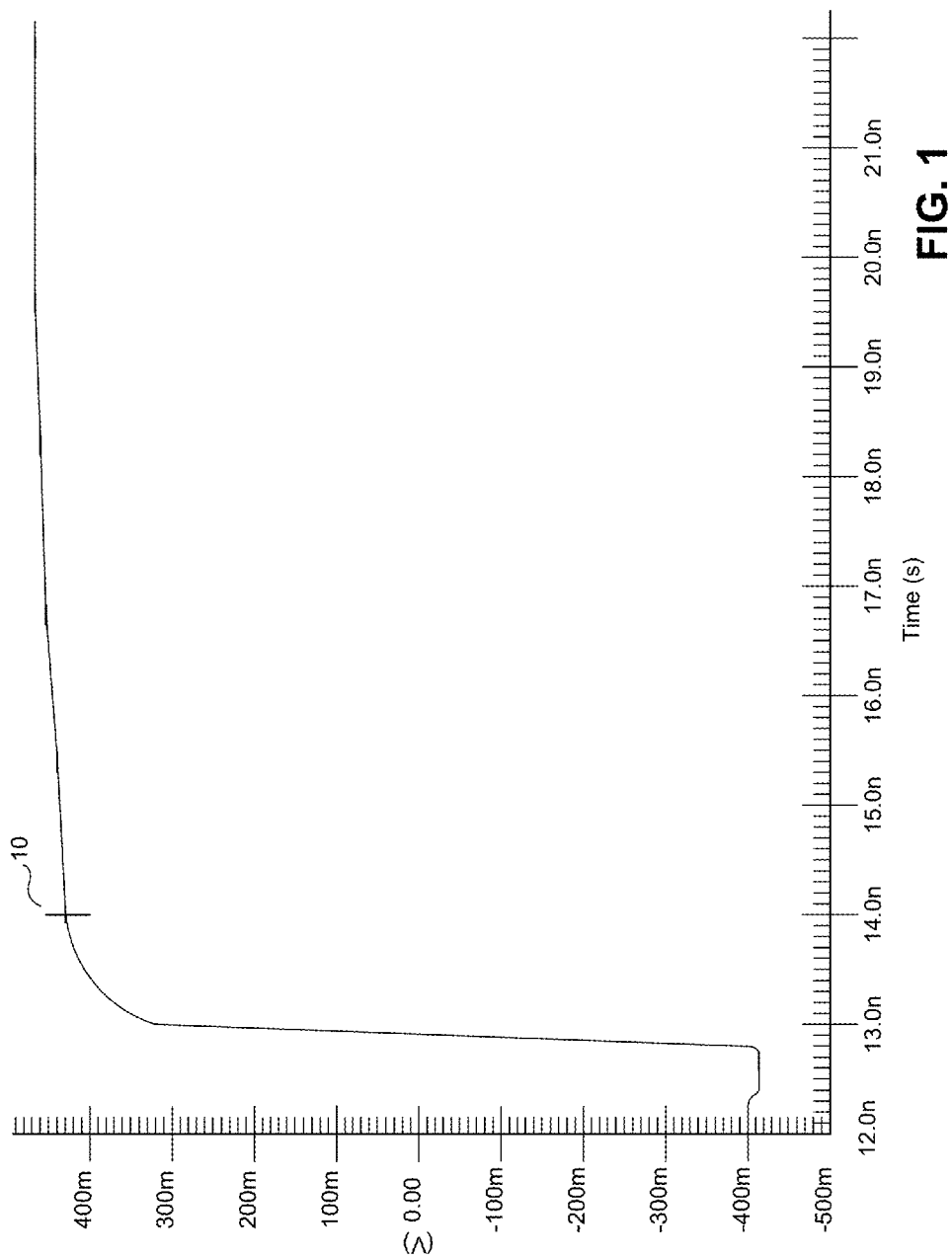
FIG. 1 illustrates an example frequency response of a channel on an output transmitter signal.

FIG. 1 illustrates an example frequency response of a channel on an output transmitter signal. As shown in FIG. 1, the response of the channel exhibits an RC dispersive effect (e.g., a sharp attenuation) below a time (or frequency). Specifically, as shown in FIG. 1, this RC dispersive effect occurs at an elbow of the response curve at lower frequencies. This elbow or cut off frequency is marked 10 on FIG. 1. This dispersive behavior at low-frequencies causes inner symbol interference and subsequently increases data dependent jitter. The example of FIG. 1 illustrates a step response of an integrated circuit mounted on a printed circuit board that drives a FR4 6 inch 90 ohm channel.

Specifications: SFP+ and KR Modes:

The systems, circuits and techniques for data transmission of the present invention have application to effectuate serial data transmission in compliance with various industry standards. For example, in some embodiments, the circuits, systems and methods of the present invention transmit data in accordance with (1) the SFI specifications associated with SFP+ optical modules (hereafter referred to as "the SFP+ specification") and (2) the 10GBASE-KR specification from the IEEE for signaling over backplane channels in computer servers and networking equipment (hereafter referred to as the "KR specification"). Although the systems, circuits and methods of the present invention have application for compliance with the SFP+ and KR specifications, the teachings of the present invention have a broad applicability to data transmission in accordance with various standards and specifications without deviating from the spirit or scope of the invention.

Measuring Transmitter Waveform Dispersion Penalty & Data Dependent Jitter:

One performance measurement required to meet some specifications, such as the SFP+ and KR specifications, is transmitter waveform dispersion penalty ("TWDP"). In general, TWDP is defined as the difference (in dB) between a reference signal to noise ratio (SNR) and the equivalent SNR at a slicer input of a reference decision feedback equalizer (DFE) receiver for the measured waveform after propagation through a channel. For a more detailed explanation of measuring TWDP, see Explanation of IEEE 802.3, Clause 68 TWDP, Norman L. Swnson, Paul Voois, Tom Lindsay, Steve Zeng, ClariPhy Communications, Inc., 5 Jan. 2006.

One challenge in developing serial data transmitters is assuring that the transmitter design passes both TWDP specifications as well as data dependent jitter ("DDJ") specifications at the same time. For example, this operating condition is required for the SFP+ specification. Some prior art techniques and designs require advancing one operating specification at the expense of the other. For example, using some of these prior art techniques, in order to improve TWDP, DDJ, a measure of noise, is increased. The multi-pole characteristics of the channel, as well as relatively long channel lengths, limit the ability to satisfy TWDP specifications. As explained more fully below, the circuits, systems and methods of the present invention compensate for multi-pole characteristics of the channel so as to reduce jitter and rise time of data output from the transmitter.

Figure 2:
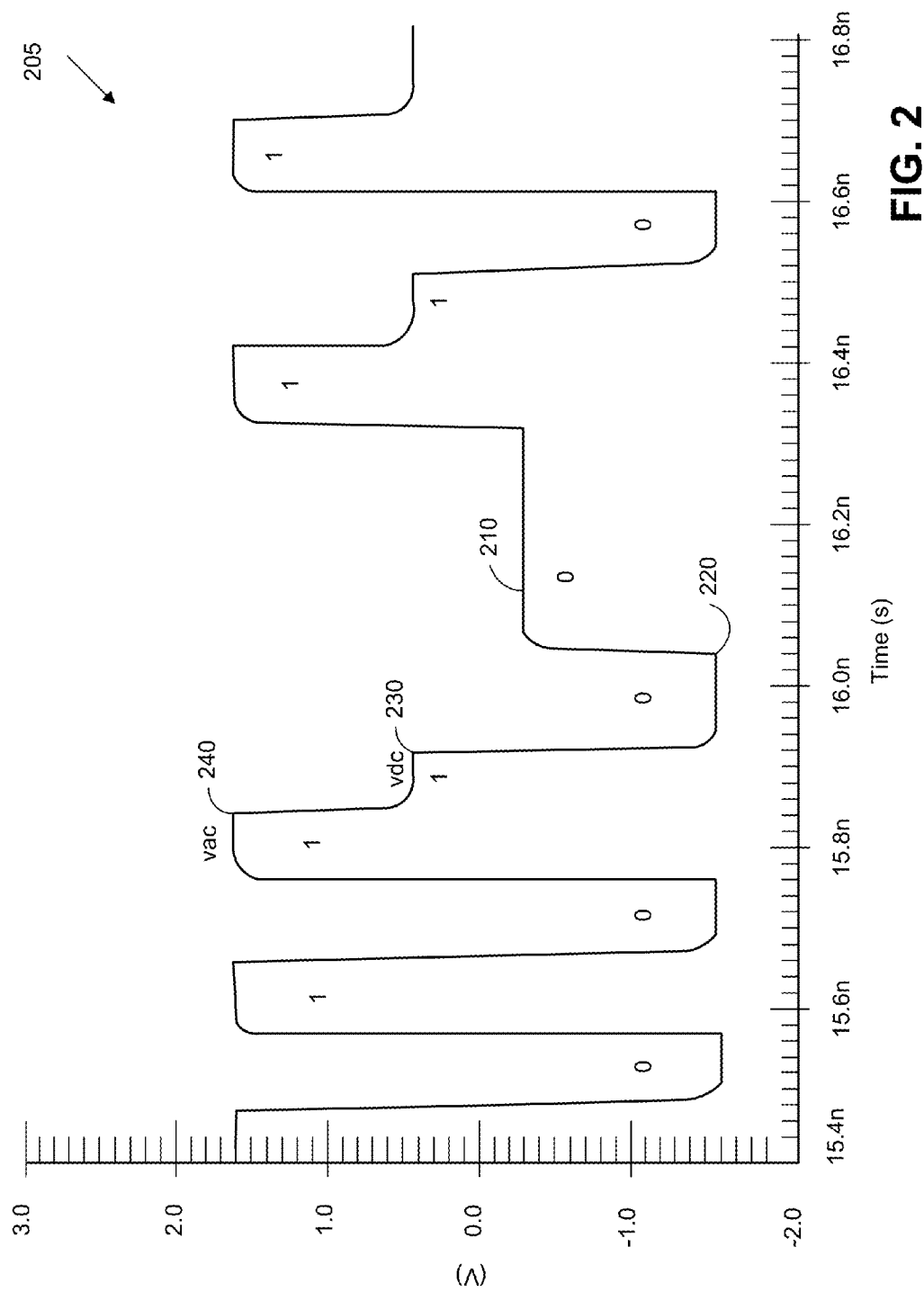
FIG. 2 illustrates a waveform for an example data pattern transmitted on a channel between the transmitter and receiver.

FIG. 2 illustrates a waveform for an example data pattern transmitted on a channel between the transmitter and receiver. As shown in FIG. 2, the effects of the channel characteristics introduce additional additives or subtractive components onto the binary waveform. Specifically, as shown in the example waveform of FIG. 2, due to the channel effect, a logic "one" level of the binary signal may be represented at different voltage levels, such as a voltage level (230) and voltage level (240). For purposes of nomenclature, voltage level (240) is defined as an AC voltage ($V_{ac}$) and voltage level (230) is referred to herein as a DC voltage ($V_{dc}$). The AC voltage represents the voltage above the DC voltage that is necessary to represent a binary "1." Similarly, a logic "zero" in the binary signal may also be represented at different voltage levels such as voltage levels (210) and (220) represented in FIG. 2.

Figure 3:
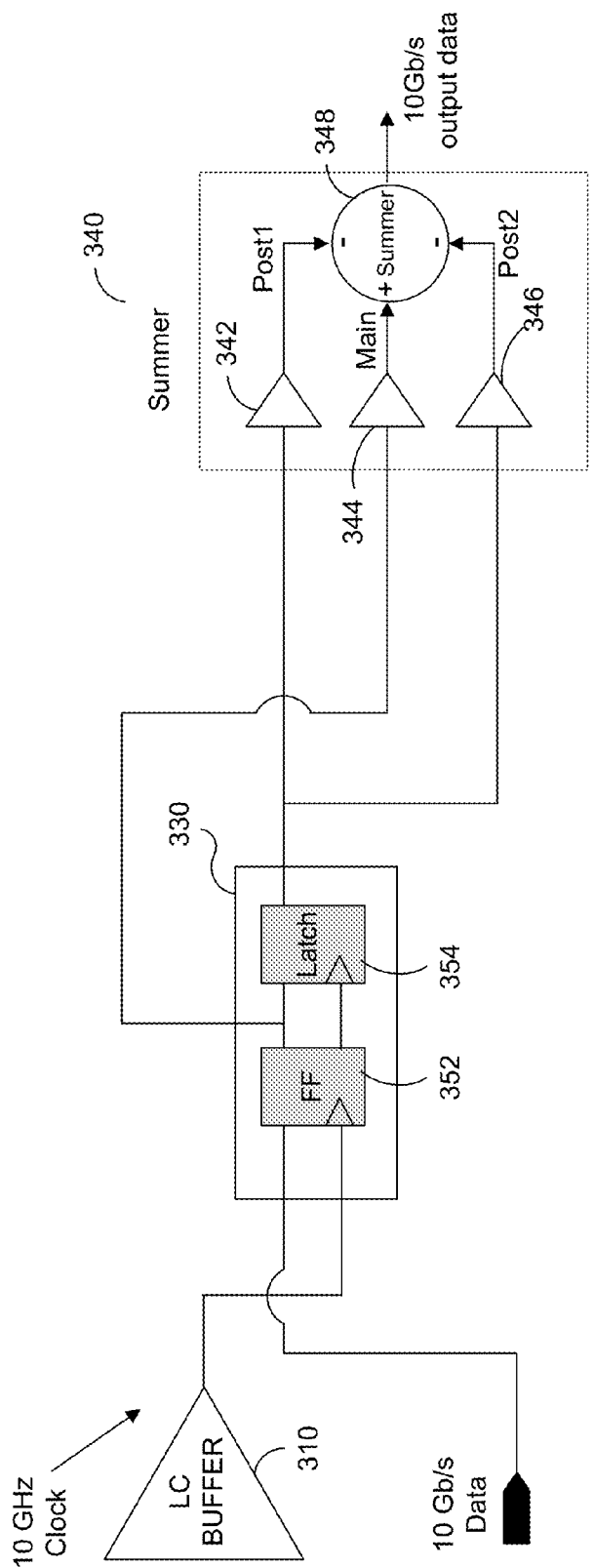
FIG. 3 illustrates a half-tap FIR circuit in accordance with one some embodiments of the invention.

Half-Tap FIR Signaling:

FIG. 3 illustrates a half-tap FIR circuit in accordance with one some embodiments of the invention. In general, the half-tap FIR circuit generates an output data stream that cancels the first pole effect exhibited by the transmission channel. As such, the half-tap FIR circuit in the transmitter effectively improves the TWDP value.

For the embodiment of FIG. 3, a half-tap shift register 330 consists of flip-flop 352 and latch 354. A clock, generated by LC buffer 310, is input to the clock input of flip-flop 352. In one embodiment, the clock consists of a 10 GHz clock, and the input data stream consists of a 10 Gb/s data stream. However, the half-tap FIR circuit has application for a wide range of data rates. During each clock cycle, serial input data stream is input to flip-flop 352. During the next clock cycle, the data output of flip-flop 352 is input to latch 354. In addition, the output of flip-flop 352 is designated as the main data signal. Latch 354 outputs data to generate two post-cursor signals. The post-cursor signals and main data signal are input to drivers (342, 346 and 344) respectively, and subsequently input to summer circuit 348. As shown in FIG. 3, summer circuit 348 subtracts the two post-cursor signals from the main signal to generate an output data stream.

Figure 4:
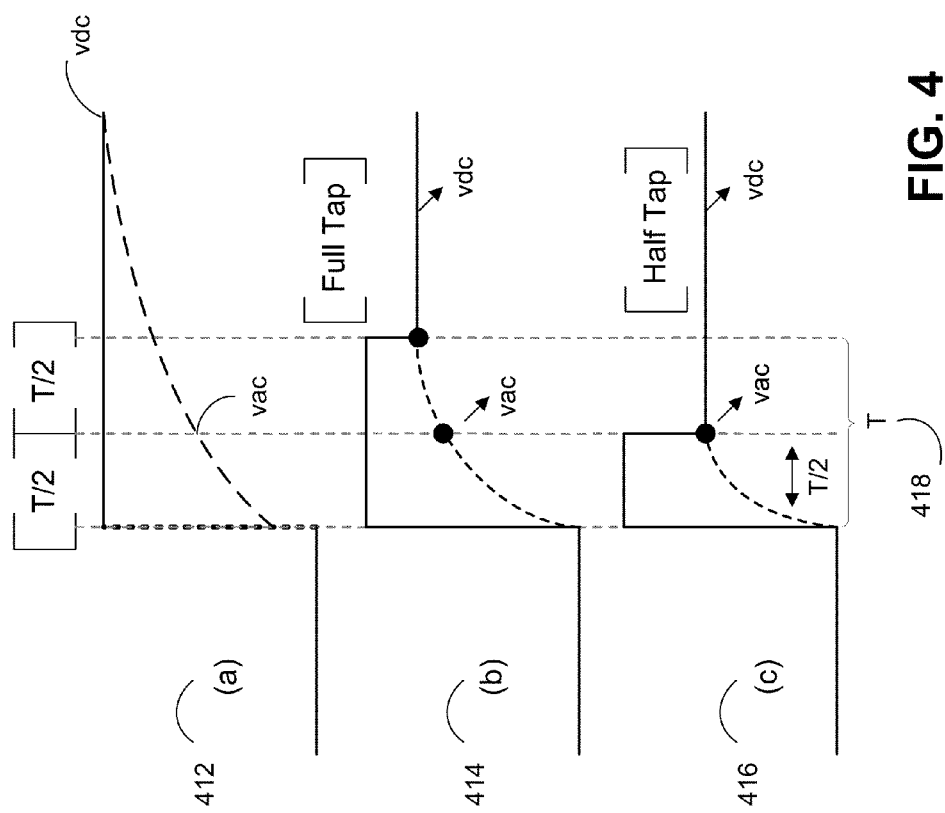
FIG. 4(a) illustrates a data pattern and resulting channel waveform propagated on a channel.
FIG. 4(b) illustrates an example waveform for the same data pattern when the output signal is conditioned using a full-tap FIR circuit.
FIG. 4(c) illustrates a third waveform propagated on the channel for the example data pattern conditioned by a half-tap FIR circuit.

FIGS. 4 (a-c) illustrate sample waveforms propagated on a channel by a transmitter for an example data pattern. Specifically, FIG. 4(a) illustrates a data pattern and resulting channel waveform propagated on a channel. For the waveform depicted in FIG. 4(a), the transmitter does not condition the output data streams (i.e., no FIR filtering). As the data pattern (shown as the waveform on top) transitions from a binary "0" to a binary "1", the voltage on the channel begins to rise. Without any FIR filtering in the transmitter, the voltage of the signal propagated on the channel continues to rise, with time, until the voltage equals the peak voltage of the data pulse, as shown in FIG. 4(a).

FIG. 4(b) illustrates an example waveform for the same data pattern when the output signal is conditioned using a full-tap FIR circuit. As shown in FIG. 4(b), as the data pattern transitions from "0" to "1", the initial voltage on the channel rises, similar to the channel waveform illustrated in FIG. 4(a). However, after a full clock cycle, the FIR conditioning reduces the voltage to the voltage level labeled $V_{ac}$ on FIG. 4(b). Consequently, the voltage waveform on the channel does not rise to the peak voltage level as shown in FIG. 4(a). As shown in FIG. 4(b), the DC voltage ($V_{dc}$) is reduced from the DC voltage in the unconditioned waveform of FIG. 4(a). In turn, the reduced DC voltage generated by the full-tap FIR improves TWDP.

FIG. 4(c) illustrates a third waveform propagated on the channel for the example data pattern conditioned by a half-tap FIR circuit. Similar to the example waveforms of FIGS. 4(a) and 4(b), the voltage begins to rise when the data pattern transitions from "0" to a "1." At one half period after the data transition, the half-tap FIR circuit conditions the output data stream so as to level off the voltage (i.e., the voltage does not increase above the voltage level attained at the one half period time). As shown in FIG. 4(c), the maximum voltage ($V_{ac}$) is equal to the DC voltage. In turn, this maximizes the ratio of $V_{ac}/V_{dc}$, and consequently minimizes the TWDP value.

Figure 5:
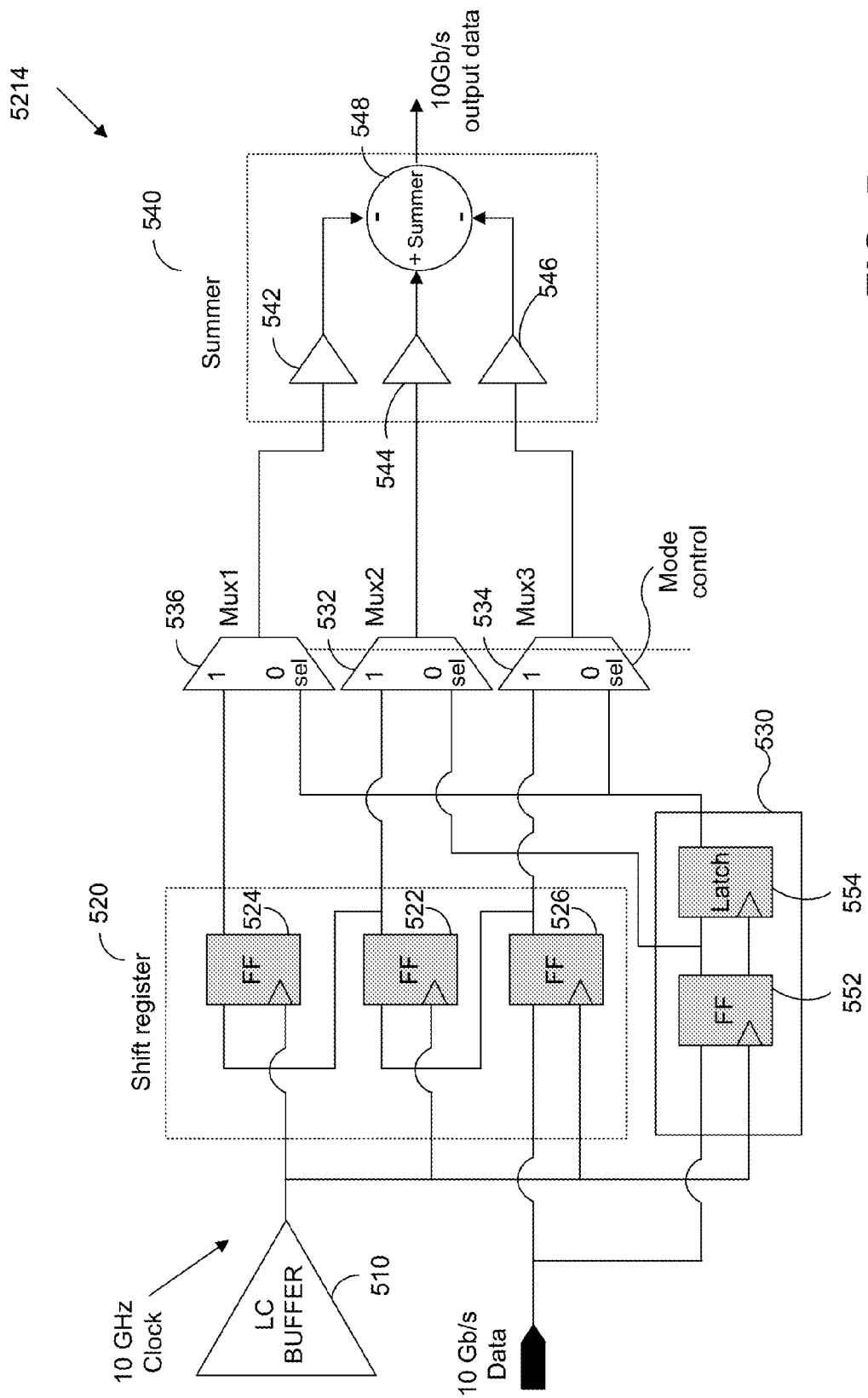
FIG. 5 illustrates one embodiment for a multi-mode circuit that includes both a half-tap FIR circuit and a full-tap FIR circuit.

Full-Tap & Half-Tap FIR Filtering (Multi-Mode Integrated Circuit):

FIG. 5 illustrates one embodiment for a multi-mode circuit that includes both a half-tap FIR circuit and a full-tap FIR circuit. For some embodiments, circuit 5214 may operate in different modes. Specifically, for this embodiment, when circuit 5214 is enabled in KR mode, then the full-tap FIR circuit is enabled and the half-tap FIR circuit is disabled or powered down. Alternatively, when circuit 5214 is enabled in SPF+ mode, then the full-tap FIR circuit is disabled and the half-tap FIR circuit is enabled.

As shown in FIG. 5, when the full-tap FIR circuit is enabled, a clock (e.g., 10 GHz clock) is output from LC buffer (510) to shift register 520. Specifically, the 10 GHz clock is input to the clock inputs of flip-flops 525, 522 and 526. The input data stream (10 Gb/s) is input to the first flip-flop (526) of the shift register 520. The output of flip-flop 526, which comprises the input data shifted one clock cycle, is input to multiplexer 534 as the pre-cursor data signal. Also, the output data signal from flip-flop 526 is the input data signal to flip-flop 522. The output of flip-flop 522, which comprises the data input one clock cycle prior, is input to multiplexer 532 and is designated as the main data signal. In addition, the data output of flip-flop 522 is input to the data input of flip-flop 525. The output of flip-flop 525, which comprises its data input one clock cycle later, is input to multiplexer 536 to generate the post cursor signal.

As shown in FIG. 5, multiplexers 534, 532 and 536 receive, as an input, a mode control signal. When the mode control signal is input to select KR mode, then the output of shift register 520 (i.e., full-tap FIR circuit) is output from the multiplexers (534, 532 and 536). Alternatively, when the mode control selects SFP+ mode, the multiplexers (534, 532 and 536) output signals from half-tap shift register 530 (i.e., half-tap FIR circuit).

Figure 6:
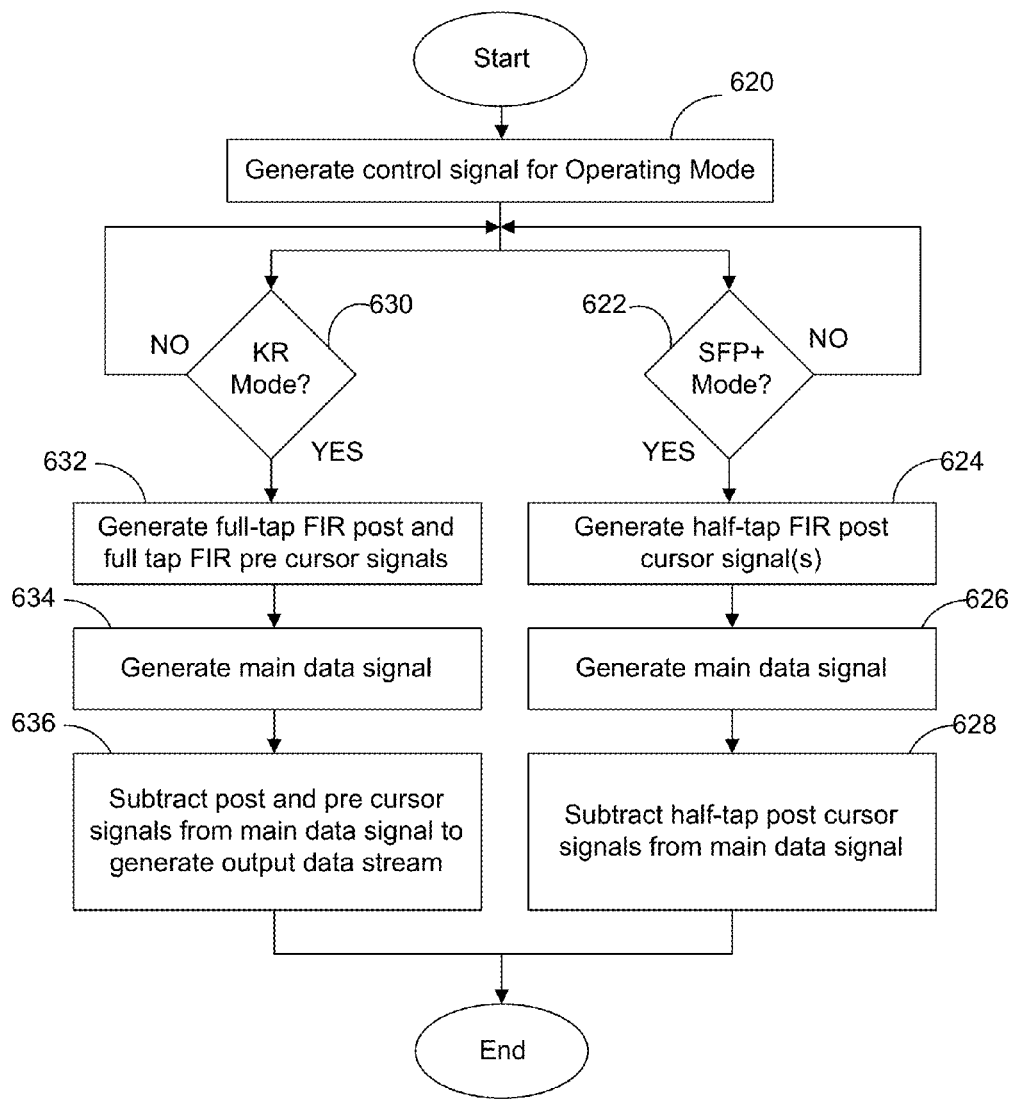
FIG. 6 is a flow diagram illustrating one embodiment for operation of multimode transmitter integrated circuit.

FIG. 6 is a flow diagram illustrating one embodiment for operation of multimode transmitter integrated circuit. A control signal is generated to select the operating mode for the transmitter (block 610). In some embodiments, the control signal may be provided externally to the transmitter integrated circuit to allow programmable selection of the operating mode. In other embodiments, the control signal may be pre-configured for permanent operation in the selected mode. If the control signal is set to select the KR mode, then the transmitter generates full-tap FIR post and pre cursor signals (block 632). Thereafter, the main data signal is generated (block 634). The post and pre-cursor signals are subtracted from the main data signal to generate the output stream. Alternatively, if the control signal selects the SFP+ mode, then the transmitter generates half-tap FIR post signals. The main data signal is generated, and the post cursor signals are subtracted from it (blocks 526 and 528).

Cancel Effects of Second-Pole Channel Characteristic:

As explained more fully below, in some embodiments, the full-tap FIR or half-tap FIR circuits are used to cancel the inner symbol interference effect exhibited by a one-pole transfer characteristic in the channel. In other embodiments, the channel exhibits a two-pole or multi-pole effect. For these embodiments, in order to cancel the inner symbol interference effect, a low pass filter ("LPF") filter is used. In some embodiment, the LPF is implemented using a resistive-capacitive ("RC") filter. In general, the LPF (e.g., RC filter) cancels the effect of the second pole on the transmitter output signal. Specifically, the LPF conditions the output serial data stream at frequencies approximately equal to and below the cut-off frequency. The use of a LPF in the transmitter produces a signal with very low jitter as well as a TWDP value.

Figure 7:
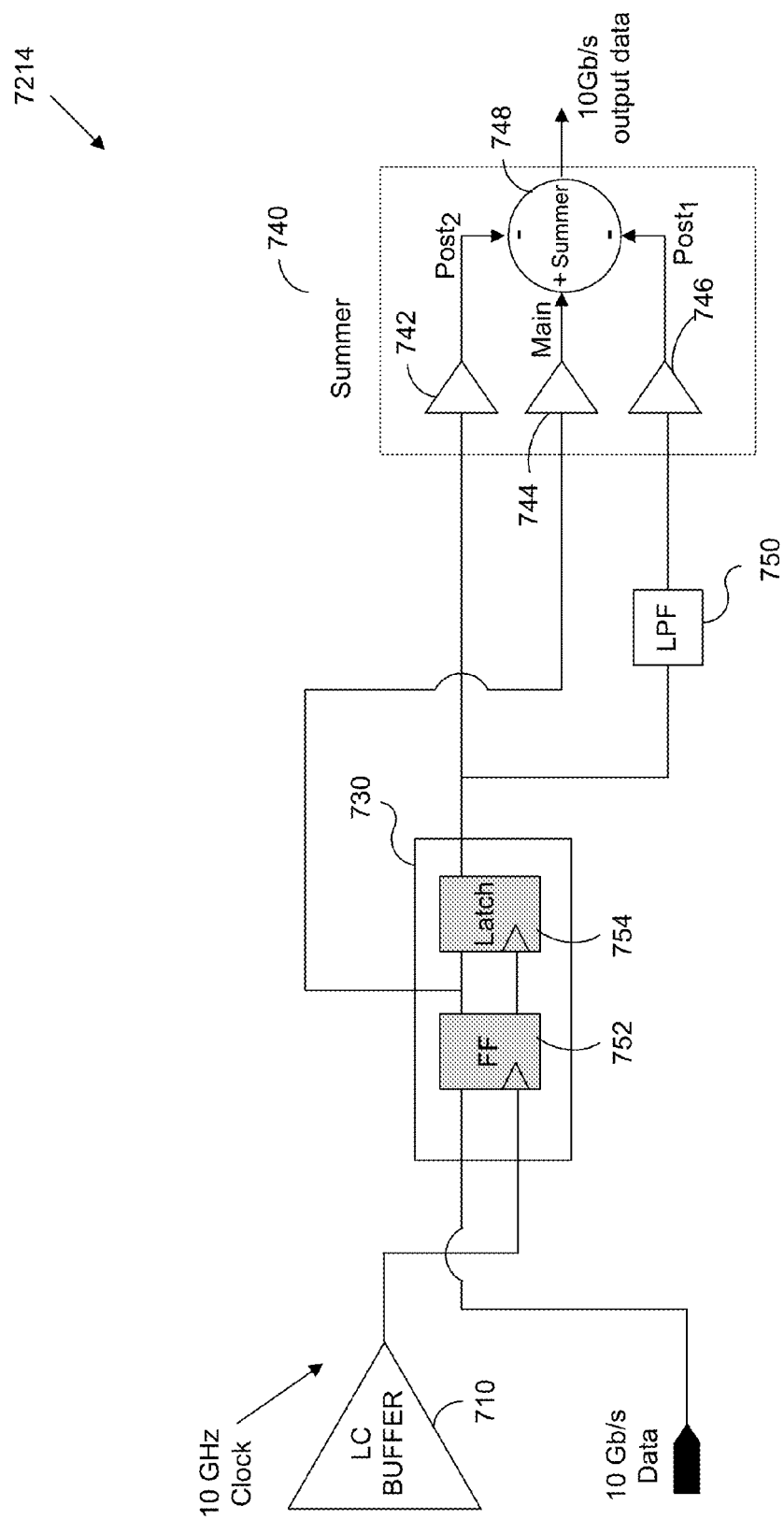
FIG. 7 illustrates a half-tap IIR circuit in accordance with some embodiments of the invention.

FIG. 7 illustrates a half-tap IIR circuit in accordance with some embodiments of the invention. In general, the half-tap IIR circuit generates an output data stream that cancels the multi-pole effect (i.e., first and second poles) exhibited by the transmission channel. As such, the half-tap IIR circuit in the transmitter effectively improves both the TWDP value and reduces data dependent jitter.

As shown in FIG. 7, a half-tap shift register 730 consists of flip-flop 752 and latch 754. A clock, generated by LC buffer 710, is input to the clock input of flip-flop 752. In one embodiment, the clock consists of a 10 GHz clock, and the input data stream consists of a 10 Gb/s data stream. During each clock cycle, serial input data stream is input to flip-flop 752. During the next clock cycle, the data output of flip-flop 752 is input to latch 754. In addition, the output of flip-flop 752 is designated as the main data signal. Latch 754 outputs data to generate two post-cursor signals. A first post cursor signal is input to low pass filter ("LPF") 750, and the second post-cursor signal, along with the main data signal, are input to drivers (742 and 744). The filtered post cursor signal is then input to driver (746). The outputs of drivers (742, 744 and 746) are input to summer circuit 748. As shown in FIG. 7, summer circuit 748 subtracts the two post-cursor signals, including the filter post cursor signal, from the main signal to generate an output data stream.

Figure 8:
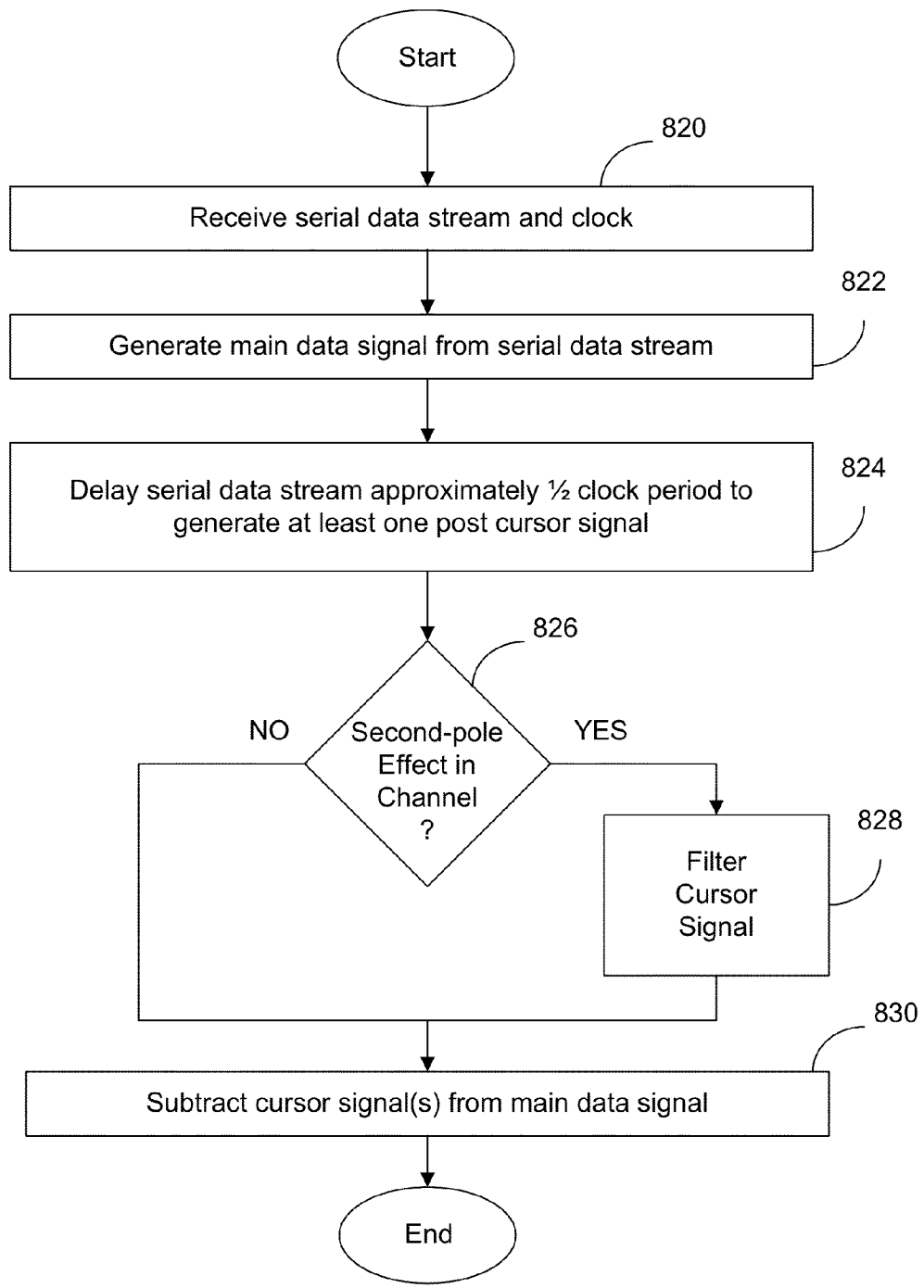
FIG. 8 is a flow diagram illustrating one embodiment for generating a conditioned signal at a transmitter output.

FIG. 8 is a flow diagram illustrating one embodiment for generating a conditioned signal at a transmitter output. In general, the transmitter generates a serial data stream for transmission across a channel. The process begins by receiving a serial data stream and clock (block 810). For this embodiment, the transmitter conditions the serial data stream to offset signal degradation caused by the multi-effect of the transmission channel. As shown in block 720, a main data signal is generated from the serial data stream. In order to compensate for the first pole channel effects, the serial data stream is delayed less than a full clock cycle to generate at least one cursor signal (block 734). In some embodiments, the serial data stream is delayed one half period (clock cycle) to generate the post cursor signals. In some embodiments, two post cursor signals are generated. If the channel exhibits a second pole effect (e.g., a long transmission line), then a post cursor signal is filtered by a low pass filter. Thereafter, the post cursor signals are subtracted from the main signal to generate a serial data out stream.

Figure 9:
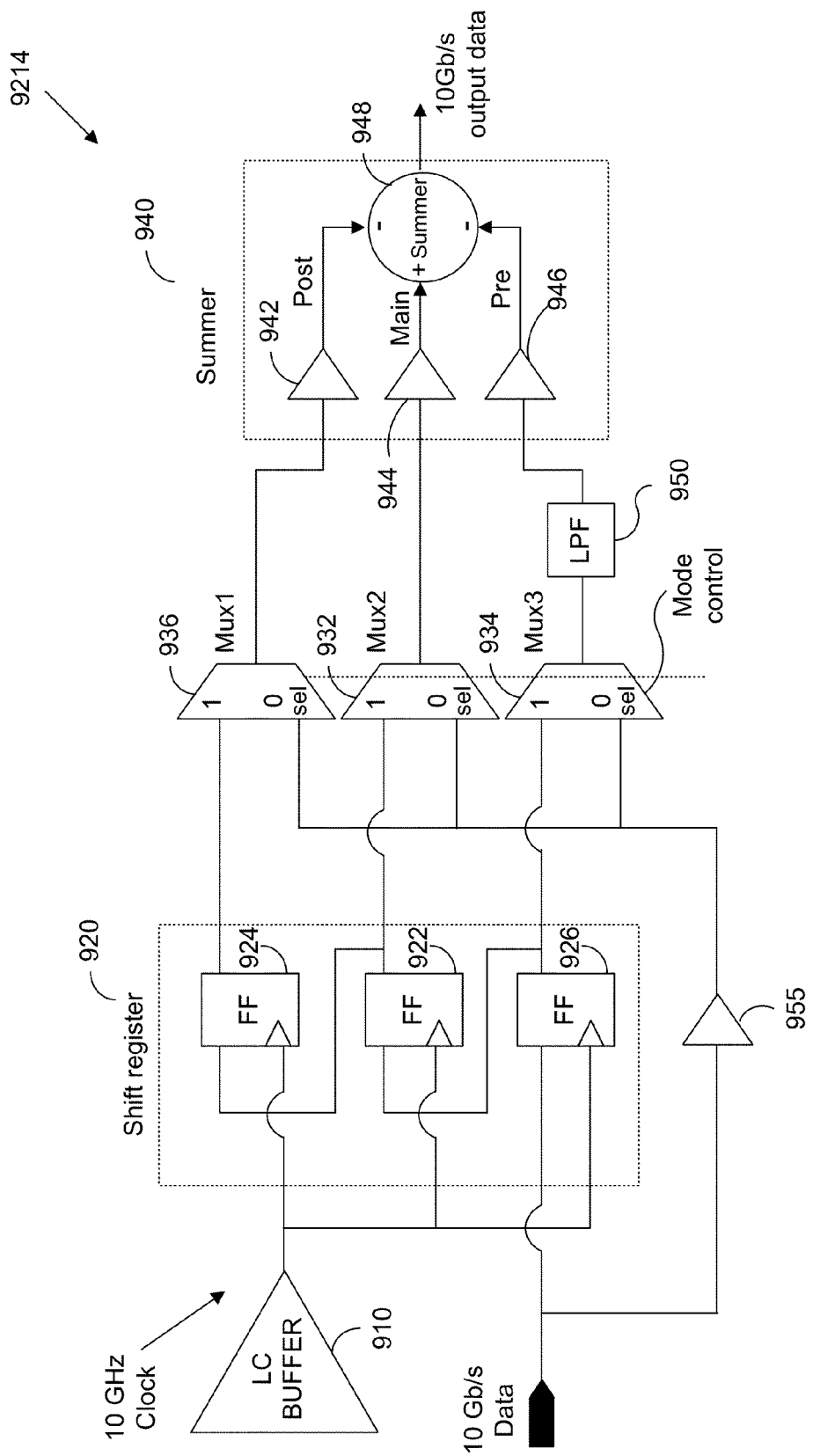
FIG. 9 illustrates one embodiment for a full-tap FIR circuit that incorporates filtering to cancel the second-pole effect introduced on the channel.

FIG. 9 illustrates one embodiment for a full-tap FIR circuit that incorporates filtering to cancel the second-pole effect introduced on the channel. The full-tap FIR circuit 9214 has application for use in KR mode with relatively long traces up to 40 inches. As shown in FIG. 9, a 10 GHz clock is input to the clock inputs of flip-flops 925, 922 and 926. The input data stream (10 Gb/s) is input to the first flip-flop (926) of shift register 920. The output of flip-flop 926, which comprises the input data shifted one clock cycle, is input to multiplexer 934 as the pre-cursor data signal. Also, the output data signal from flip-flop 926 is the input data signal to flip-flop 922. The output of flip-flop 922, which comprises the data input one clock cycle prior, is input to multiplexer 932 and is designated as the main data signal. In addition, the data output of flip-flop 922 is input to the data input of flip-flop 925. The output of flip-flop 925, which comprises its data input one clock cycle later, is input to multiplexer 936 to generate the post cursor signal.

As shown in FIG. 9, multiplexers 934, 932 and 936 receive, as an input, a mode control signal. When the mode control signal is input to select KR mode, then the output of shift register 920 is selected for output from the multiplexers (934, 932 and 936). As shown in FIG. 9, the pre-cursor signal is filtered in LPF 950. One embodiment for LPF 950 is described in conjunction with FIG. 13. Also, as discussed above, LPF 950 may be programmable to select a cut-off frequency to set the response characteristics of the filter for the appropriate data rate (See Table 1 below). The filtered pre-cursor signal is then input to driver (946). The outputs of drivers (942, 944 and 946) are input to summer circuit 948. As shown in FIG. 9, summer circuit 948 subtracts the filtered pre-cursor signal and the post-cursor signal from the main signal to generate an output data stream.

Figure 10:
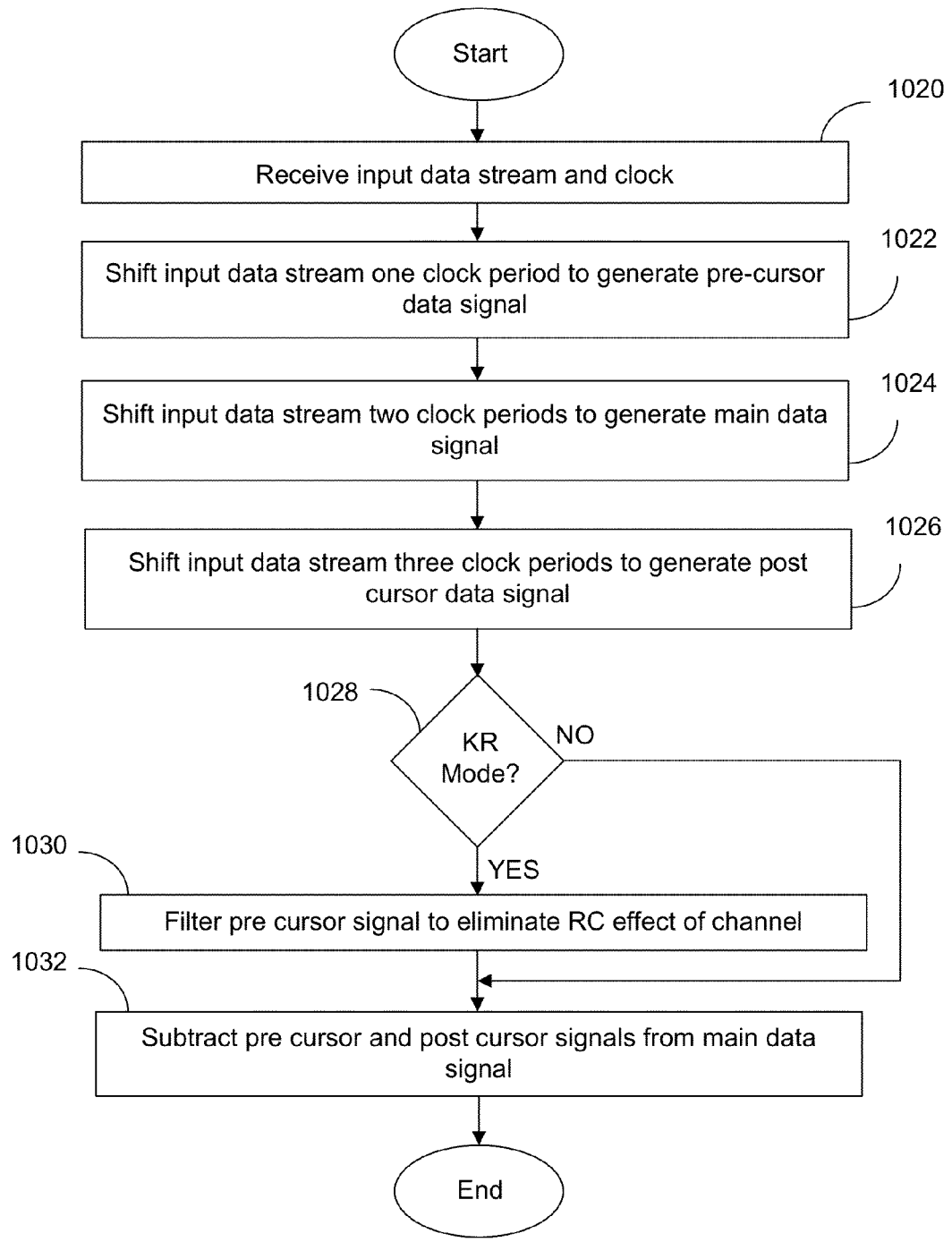
FIG. 10 is a flow diagram illustrating one embodiment for a full-tap FIR circuit that incorporates filtering to compensate for a second-pole characteristic exhibited on the channel.

FIG. 10 is a flow diagram illustrating one embodiment for a full-tap FIR circuit that incorporates filtering to compensate for a second-pole characteristic exhibited on the channel. The circuit receives an input data stream and clock (block 1020). The input data stream is shifted one clock cycle to generate a pre-cursor is signal (block 1022). The stream is also shifted two clock periods to generate the main data signal (block 1024). In addition, the input data stream is shifted three clock cycles to generate a post cursor data signal. If the multimode chip is set to operate in KR mode, then the precursor signal is filtered to eliminate the dispersive RC effects of the channel (block 1030). If the multimode chip is not configured to operate in KR mode, then the precursor signal is not filtered. Thereafter, the post cursor signals are subtracted from the main data signal to generate the output data stream.

Figure 11:
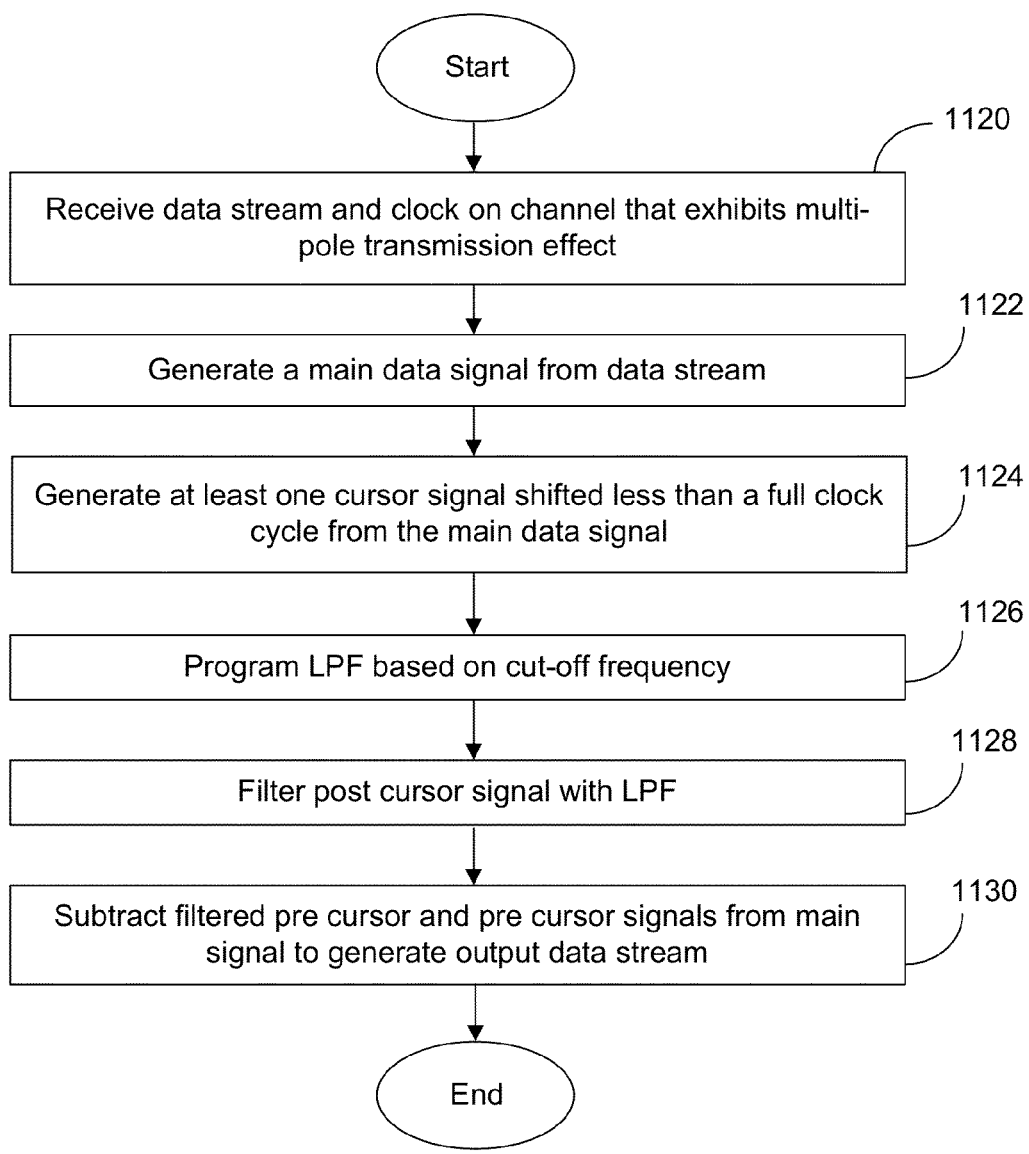
FIG. 11 is a flow diagram illustrating one embodiment for eliminating multi-pole transmission effects from a transmitter.

FIG. 11 is a flow diagram illustrating one embodiment for eliminating multi-pole transmission effects from a transmitter. The input data stream and clock are received by the transmitter for transmission on a channel that exhibits multi-pole characteristics (block 1120). A main data signal is generated from the input data stream (block 1122). At least one cursor signal is shifted less than a full clock cycle from the main data signal (block 1124). A cutoff frequency is programmed to a low pass filter (block 1126). The precursor signal is filtered with the LPF (block 1128). To generate the output data stream, the filtered and unfiltered post cursor signals are subtracted from the main signal (block 1130).

Figure 12:
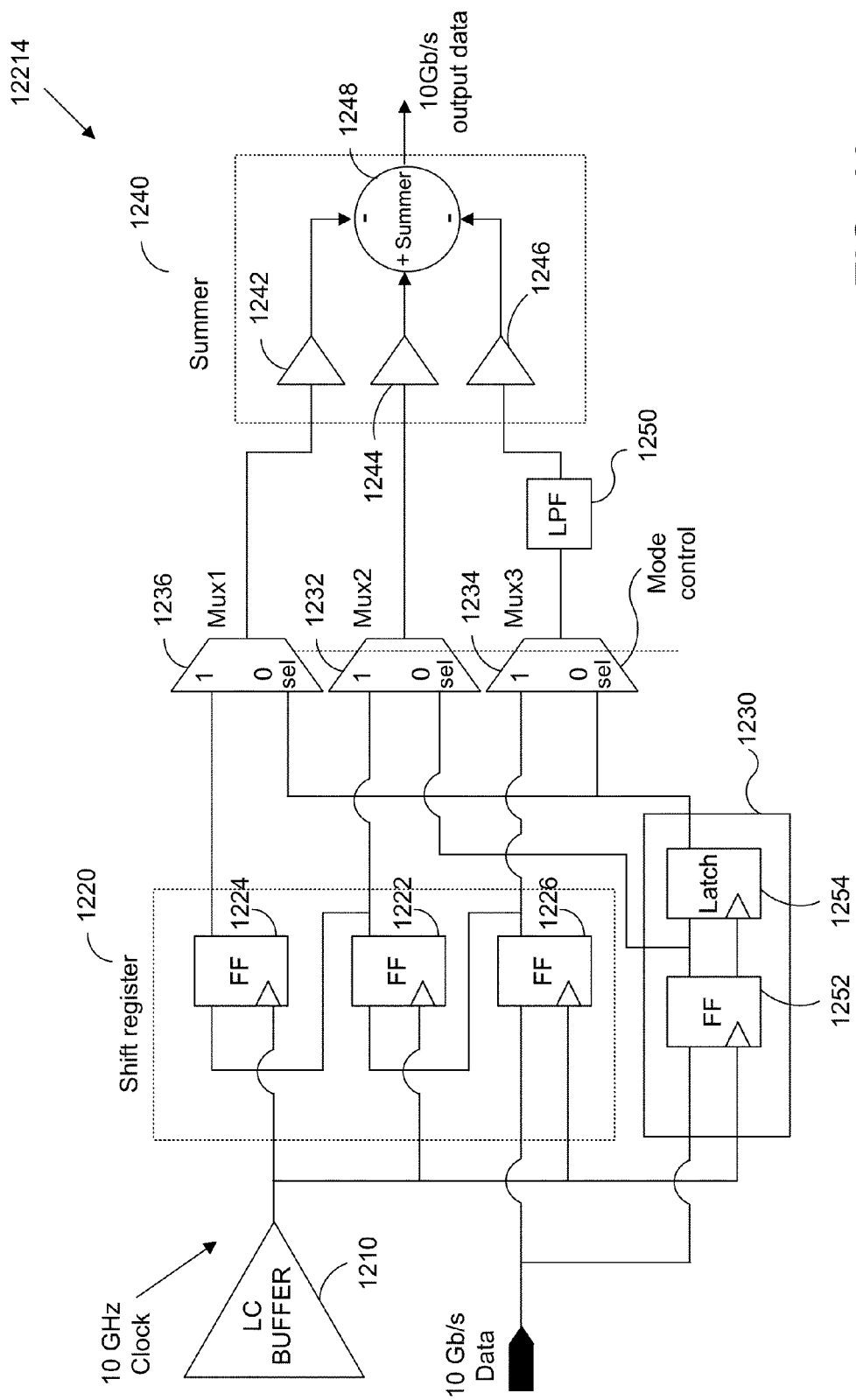
FIG. 12 illustrates one embodiment for a multi-mode transmitter circuit that incorporates filtering to cancel the second-pole effect introduced on the channel.

FIG. 12 illustrates one embodiment for a multi-mode transmitter circuit that incorporates filtering to cancel the second-pole effect introduced on the channel. For this embodiment, circuit 12214 may operate in different modes. For example, in some embodiments, circuit 12214 may operate in KR mode or operate in SPF+ mode. For this embodiment, when circuit 12214 operates in KR mode, then the full-tap FIR circuit is enabled. Alternatively, when circuit 12214 operates in SPF+ mode, then the half-tap FIR circuit is enabled.

As shown in FIG. 12, when the full-tap FIR circuit is enabled, a clock (e.g., 10 GHz clock) is output from LC buffer (1210) to shift register 1220. Specifically, the 10 GHz clock is input to the clock inputs of flip-flops 1225, 1222 and 1226. The input data stream (10 Gb/s) is input to the first flip-flop (1226) of the shift register 1220. The output of flip-flop 1226, which comprises the input data shifted one clock cycle, is input to multiplexer 1234 as the pre-cursor data signal. Also, the output data signal from flip-flop 1226 is the input data signal to flip-flop 1222. The output of flip-flop 1222, which comprises the data input one clock cycle prior, is input to multiplexer 1232, and is designated as the main data signal. In addition, the data output of flip-flop 1222 is input to the data input of flip-flop 1225. The output of flip-flop 1225, which comprises its data input one clock cycle later, is input to multiplexer 1236 to generate the post cursor signal.

When circuit 12214 operates in SPF+ mode, then the clock, generated by LC buffer 1210, is input to the clock input of flip-flop 1252 and latch 1254. During each clock cycle, serial input data stream is input to flip-flop 1252. During the next clock cycle, the data output of flip-flop 1252 is input to latch 1254. In addition, the output of flip-flop 1252 is designated as the main data signal. Latch 1254 outputs data to generate two post-cursor signals.

As shown in FIG. 12, multiplexers 1234, 1232 and 1236 receive, as an input, a mode control signal. When the mode control signal is input to select KR mode, then the output of shift register 1220 (i.e., full-tap FIR circuit) is selected from the multiplexers (1234, 1232 and 1236). Alternatively, when the mode control selects SFP+ mode, the multiplexers (1234, 1232 and 1236) select signals from half-tap shift register 1230 (i.e., half-tap FIR circuit).

When KR mode is selected, the full-tab pre-cursor signal is filtered in LPF 1250. Alternatively, when SFP+ mode is selected, the half-tab post-cursor signal is filtered in LPF 1250. One embodiment for LPF 1250 is described in conjunction with FIG. 13. Also, as discussed above, LPF 1250 may be programmable to select a cut-off frequency to set the response characteristics of the filter for the appropriate data rate (See Table 1). The filtered full-tab pre-cursor signal (KR mode) or filtered half-tab post-cursor signal (SPF+ mode) is input to driver (1246). Also, the post-cursor signal (KR or SPF+ modes) and main data signal are input to drivers (1242 and 1244) respectively, and subsequently input to summer circuit 1248. As shown in FIG. 12, summer circuit 1248 subtracts the cursor signals (i.e., pre and post cursor signals from the full-tab circuit or post cursor signals from the half-tab circuit) from the main signal to generate an output data stream.

Figure 13:
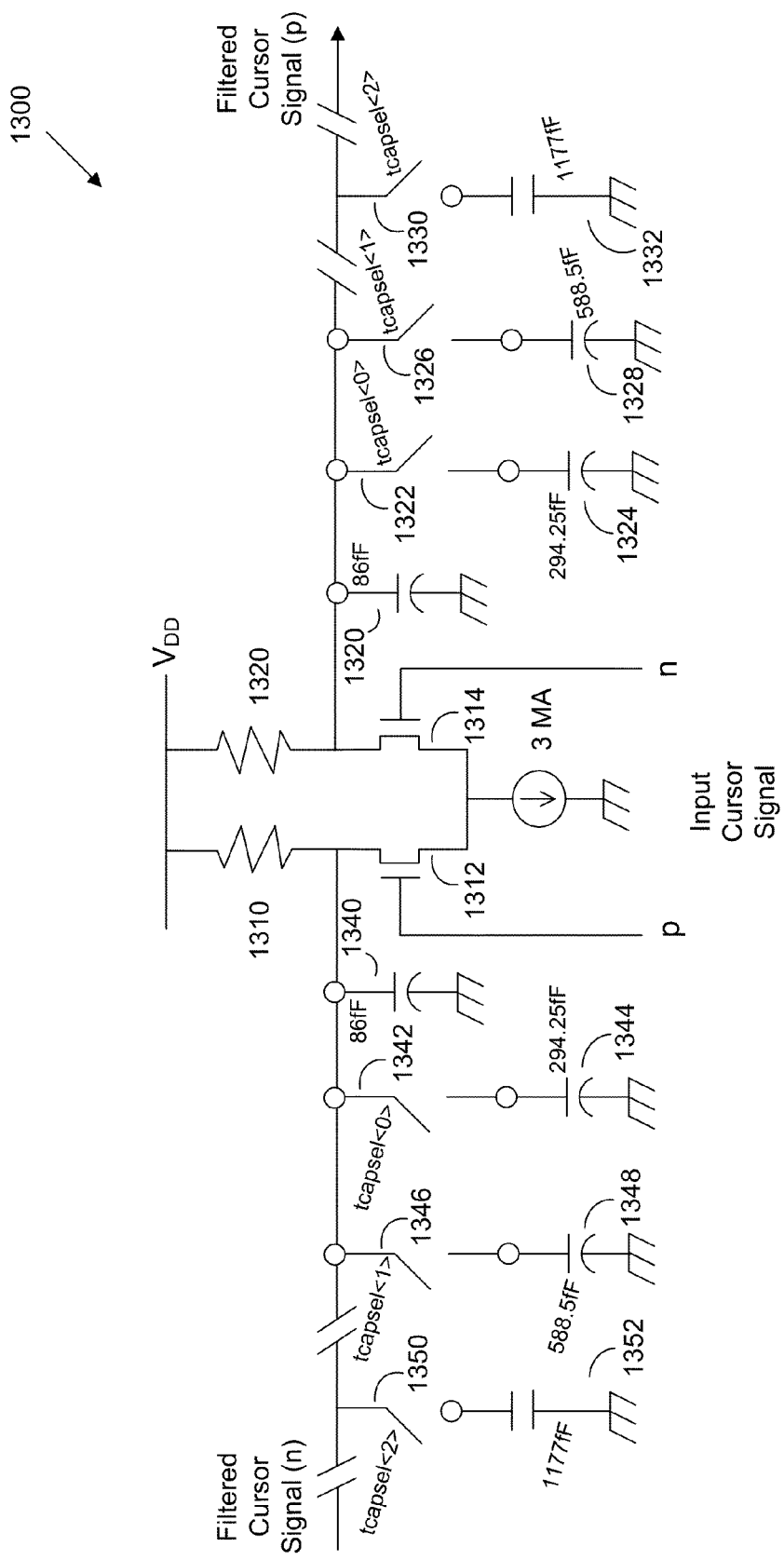
FIG. 13 illustrates a circuit for a programmable filter in accordance with some embodiments of the present invention.

In some embodiments, the LPF filter is programmable in order to program the filter to a cut-off frequency suitable for the data rate of the output serial data stream. In some embodiments for the programmable LPF, switches (e.g., MOS transistors) are used to add capacitance, in parallel, to a series resistance as necessary to tune the filter for a particular cutoff frequency. FIG. 13 illustrates a circuit for a programmable filter in accordance with some embodiments of the present invention. In some embodiments, as described below, a pre-cursor signal, shifted at least a partial period of the clock from a main data signal, is input to the low pass filter. For the embodiment shown in FIG. 13, an RC filter is used to implement the low pass filter function.

As shown in FIG. 13, a signal (e.g., input cursor signal "n" and "p"), generated in the transmitter, is input to RC filter 1300. The RC filter 1300 consists of resistors 1310 and 1320, coupled in series with MOS transistors 1312 and 1314. A current source (e.g., 3 mA) sinks current from the transistors to ground. A capacitor 1320 is coupled in parallel with transistor 1314, and a capacitor 1342 is coupled in parallel with transistor 1312. In some embodiments, capacitors 1320 and 1340 have values of 86 femto-farads ("fF"). In order to change the cutoff frequency of the low pass response, one or more capacitors are selected to add additional capacitance, in parallel, to the output of the filter 1300. Specifically, capacitors 1344, 1348 and 1352 may be coupled to the output of filter 1300 via switches 1342, 1346 and 1350, and capacitors 1324, 1328 and 1332 may be coupled to the output of filter 1300 via switches 1322, 1326 and 1330. As shown in FIG. 13, switch pairs (1322 and 1342), (1326 and 1346) and (1350 and 1330) are controlled by signals tcapsel<0>, tcapsel<1> and tcapsel<2>, respectively. Although the RC filter is shown with three switches per side, any number of switches may be use to couple additional capacitors in parallel so as to increase the capacitance and/or to increase the granularity of the programmability of the RC filter.

Table 1 below illustrates selecting capacitors, through control signals tcapsel<2:0>, for a specified cut-off frequency and a specified mode.

TABLE 1

| SFP+ | tcapsel<2:0> | Cut_Off_Frequency |
|---|---|---|
|  | 0,0,0 | 12.36 GHz |
|  | 0,0,1 | 3.22 GHz |
|  | 0,1,0 | 1.62 GHz |
|  | 0,1,1 | 1.00 GHz |
|  | 1,0,0 | 0.84 GHz |
|  | 1,0,1 | 0.66 GHz |
|  | 1,1,0 | 0.58 GHz |
|  | 1,1,1 | 0.50 GHz |
| KRMODE | 0,0,0 | 12.36 GHz |

Figure 14:
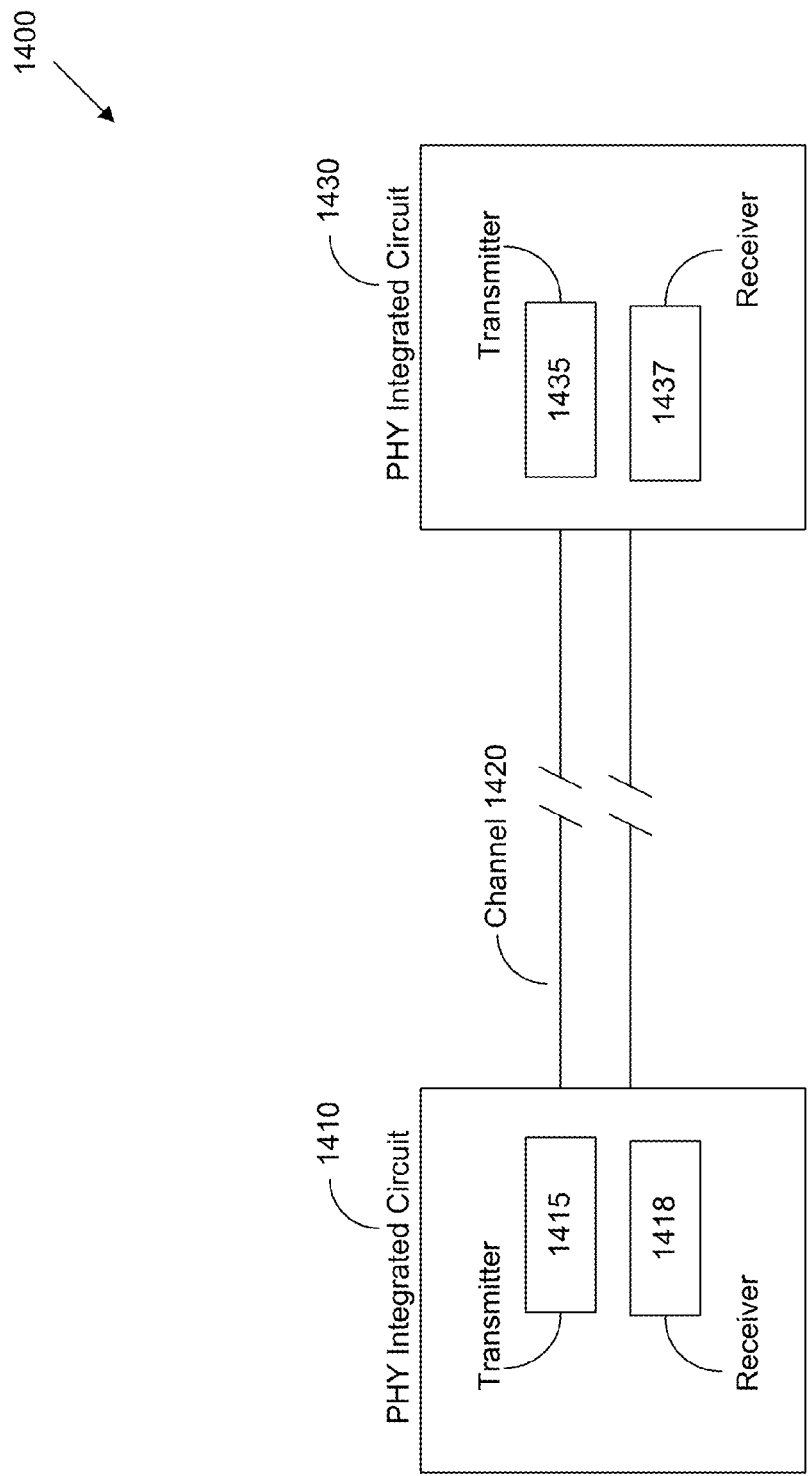
FIG. 14 is a block diagram that illustrates one embodiment for implementing the transmitter circuits and method on a single integrated circuit ("IC").

The circuits and methods of the present invention may be implemented on one or more integrated circuits. FIG. 14 is a block diagram that illustrates one embodiment for implementing the transmitter circuits and method on a single integrated circuit ("IC"). For this embodiment, a physical layer ("PHY Layer") integrated circuit 1410 includes, as at least a portion of the IC, a transmitter 1415 and a receiver 1418. In general, the transmitter 1410 modulates and conditions data streams for transmission in a physical medium, such as channel 1420. In some embodiments, transmitters (1415 and 1435) comprise, at least in part, the half-tap circuits of FIGS. 3 and 7. In other embodiments, the transmitters (1415 and 1435) comprise, at least in part, a multi-mode transmitter that incorporates both a half-tap and full-tap circuits of FIGS. 5 and 12. In yet other embodiments, transmitters (1415 and 1435) comprise, at least in part, the full-tap circuit of FIG. 9. For this embodiment, the PHY ICs (1410 & 1430) operate as transceivers (i.e., the ICs both transmit and receive data from the channel 1420). However, the transmitter (1415 & 1435) may be implemented as a single integrated circuit. Also, the transmitter (1415 & 1435) and/or receiver (1435 & 1437) may comprise IP blocks for incorporation into one or more integrated circuits.

Figure 15:
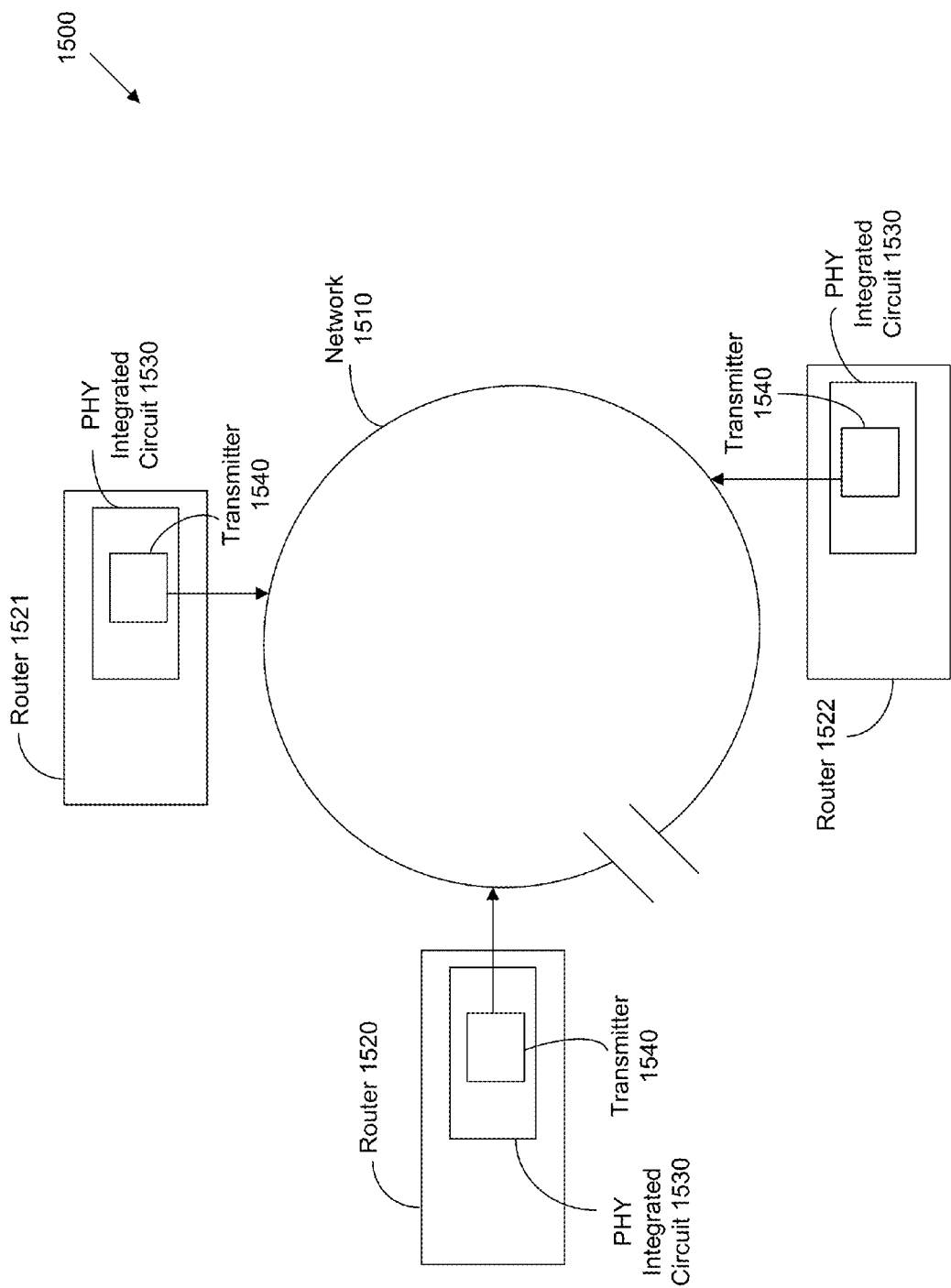
FIG. 15 is a block diagram illustrating one embodiment of a network system that incorporates the transmitter circuits and methods of the present invention.

FIG. 15 is a block diagram illustrating one embodiment of a network system that incorporates the transmitter circuits and methods of the present invention. For this embodiment, one or more routers (1520, 1521 and 1522) (e.g., TCP/IP routers) couple one or more computer devices (not shown) to a network 1510 (e.g., an Ethernet network). The routers (1520, 1521 and 1522) incorporate one or more physical layer ("PHY") integrated circuits 1530. In turn, the PHY integrated circuits incorporate a transmitter 1540. In some embodiments, transmitters (1540) comprise, at least in part, the half-tap circuits of FIGS. 3 and 7. In other embodiments, the transmitters (1540) comprise, at least in part, a multi-mode transmitter that incorporates both a half-tap and full-tap circuits of FIGS. 5 and 12. In yet other embodiments, transmitters (1540) comprise, at least in part, the full-tap circuit of FIG. 9.

Hardware Embodiments

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for decreasing jitter on a data stream transmitted across a channel, said method comprising:
   receiving a data stream for transmission across a channel that exhibits a multi-pole transmission characteristic;
   generating a main data signal from said data stream;
   generating at least one cursor signal that is shifted at least a portion of a clock period from said main data signal;
   filtering said cursor signal to filter out effects based on a second pole of said multi-pole transmission characteristic; and
   subtracting said filtered cursor signal from said main data signal to generate a transmitter output data signal.

2. The method of claim 1, wherein filtering said cursor signal comprises filtering said cursor signal with a tunable filter.

3. The method of claim 1, wherein filtering said cursor signal comprises filtering said cursor signal with a low pass filter.

4. The method of claim 3, wherein said low pass filter comprises cut-off frequencies within a range of 0.5 Ghz to 12.36 Ghz for operation of said transmitter in SFP+ mode.

5. The method of claim 3, wherein said low pass filter comprises a cut-off frequency of around 12.36 GHz for operation of said transmitter in a KR operating mode.

6. A circuit for decreasing jitter on a data stream transmitted across a channel, said circuit comprising:
   a shift register configured to:
      receive a data stream for transmission across a channel that exhibits a multi-pole transmission characteristic, generate a main data signal from said data stream, and generate at least one cursor signal that is shifted at least a portion of a clock period from said main data signal;
   a filter configured to filter said cursor signal to filter out effects based on a second pole of said multi-pole transmission characteristic; and
   a summer circuit configured to subtract said filtered cursor signal from said main data signal, to generate a transmitter output data signal.

7. The circuit of claim 6, wherein said filter comprises a tunable filter.

8. The circuit of claim 6, wherein said filter comprises a low pass filter.

9. The circuit of claim 8, wherein said low pass filter comprises cut-off frequencies within a range of 0.5 Ghz to 12.36 Ghz for operation of said transmitter in SFP+ mode.

10. The circuit of claim 8, wherein said low pass filter comprises a cut-off frequency of around 12.36 GHz for operation of said transmitter in a KR operating mode.

11. The circuit of claim 6, wherein the shift register comprises a flip-flop and a latch.

12. A circuit for transmitting serial data streams across a channel that exhibits a multi-pole transmission characteristic, said circuit comprising:
   a shift register circuit configured to:
      receive a clock and input data stream, and
      shift said input data stream, in accordance with clock cycles of said clock, to generate a main data signal, a full tap pre-cursor signal shifted one previous clock cycle relative to said main data signal, and a full tap post-cursor signal shifted one subsequent clock cycle relative to said main data signal;
   a filter circuit configured to filter said full tap pre-cursor signal to filter out effects based on a second pole of said multi-pole transmission characteristic; and
   a summer circuit configured to subtract said filtered full tap pre-cursor signal and said fall tap post-cursor signal from said main data signal.

13. The circuit of claim 12, wherein said filter comprises a tunable filter.

14. The circuit of claim 12, wherein said filter comprises a low pass filter.

15. The circuit of claim 14, wherein said low pass filter comprises a cut-off frequency of around 12.36 GHz for operation of said transmitter in a KR operating mode.

16. The circuit of claim 12, wherein the shift register comprises a plurality of flip-flops.

17. A method for transmitting serial data streams across a channel that exhibits multi-pole transmission characteristic, said method comprising:
   receiving a clock and input data stream;
   shifting said data stream, in accordance with clock cycles of said clock, to generate a main data signal, a full tap pre-cursor signal shifted one previous clock cycle relative to said main data signal, and a full tap post-cursor signal shifted one subsequent clock cycle relative to said main data signal;
   filtering said fall tap pre-cursor signal to filter out effects based on a second pole of said multi-pole transmission characteristic; and
   subtracting said filtered full tap pre-cursor signal and said full tap post-cursor signal from said main data signal.

18. The method of claim 17, wherein filtering said full tap pre-cursor signal comprises filtering said full tap pre-cursor signal with a tunable filter.

19. The method of claim 17, wherein filtering said full tap pre-cursor signal comprises filtering said full tap pre-cursor signal with a low pass filter.

20. The method of claim 19, wherein said low pass filter comprises a cut-off frequency of around 12.36 GHz for operation of said transmitter in a KR operating mode.

* * * * *

UNITED STATES PATENT AND TRADEMARK OFFICE
CERTIFICATE OF CORRECTION

PATENT NO. : 8,537,949 B1
APPLICATION NO. : 12/828153
DATED : September 17, 2013
INVENTOR(S) : Cirit et al.

It is certified that error appears in the above-identified patent and that said Letters Patent is hereby corrected as shown below:

In the Claims

In Column 11, Line 25, Claim 6, please replace "signal, to" with --signal to--.

In Column 12, Line 8, Claim 12, please replace "fall" with --full--.

In Column 12, Line 31, Claim 17, please replace "fall" with --full--.

Signed and Sealed this
Twelfth Day of November, 2013

Teresa Stanek Rea
*Deputy Director of the United States Patent and Trademark Office*